United States Patent
Yang et al.

(10) Patent No.: US 7,923,527 B1
(45) Date of Patent: Apr. 12, 2011

(54) CARBON NANOTUBE COMPOUND AND METHOD FOR PRODUCING THE SAME

(75) Inventors: Cheng-Chien Yang, Longtan Township, Taoyuan County (TW); Jui-Ming Yeh, Zhongli (TW); Chia-Shiang Yang, Gongguan Township, Miaoli County (TW); Yuen-Hsin Peng, Longtan Township, Taoyuan County (TW); Kuan-Yeh Huang, Zhongli (TW)

(73) Assignee: Chung-Shan Institute of Science and Technology Armaments Bureau, Ministry of National Defense, Taoyuan County (TW)

( * ) Notice: Subject to any disclaimer, the term of this patent is extended or adjusted under 35 U.S.C. 154(b) by 31 days.

(21) Appl. No.: 12/579,007

(22) Filed: Oct. 14, 2009

(51) Int. Cl.
*C08G 69/28* (2006.01)

(52) U.S. Cl. ........ 528/351; 528/350; 528/353; 252/502; 252/510; 252/511

(58) Field of Classification Search .......... 528/350, 528/351, 353; 523/215; 252/502, 510, 511
See application file for complete search history.

(56) References Cited

U.S. PATENT DOCUMENTS

| 7,273,661 B2 * | 9/2007 | Moriyama et al. ......... 428/473.5 |
| 2010/0279095 A1 * | 11/2010 | Li et al. ......................... 428/220 |

OTHER PUBLICATIONS

Wei et al. ANTEC, Soc. Plast. Eng., vol. 55(II), pp. 1369-1372, 1997.*

* cited by examiner

*Primary Examiner* — David Wu
*Assistant Examiner* — Vu A Nguyen

(57) ABSTRACT

The invention provides a carbon nanotube compound and method for producing the same. The method of the invention comprises the following steps. Firstly, Aniline-trimer and DMAc(dimethyl acetamide) solution are mixed to form a first solution. Secondly, Dianhydride and DMAc solution are mixed to form a second solution. The first solution and the second are mixed to form a third solution. Additionally, carboxyl-multiwall carbon nanotubes (c-MWNT), Diaminodiphenylether and DMAc solution are mixed to form a fourth solution. The third solution and the fourth are mixed to form a polyamic acid/CNT solution. Some polyamic acid/CNT solution is spread on a substrate and processed by a thermal treatment, and a carbon nanotube compound is eventually produced.

9 Claims, 2 Drawing Sheets

CARBON NANOTUBE COMPOUND AND METHOD FOR PRODUCING THE SAME

BACKGROUND OF THE INVENTION

1. Field of the Invention

The invention relates to a carbon nanotube compound, and particularly, the invention relates to a compound having carboxylic-multiwall carbon nanotubes (c-MWNTs).

2. Description of the Prior Art

Because of the development of high technology, the influence of the electromagnetic wave to the instrument and the human body is deeply concerned.

The casing of the electronic device nowadays is mostly made of plastics having the characteristics such as light weight, low cost, easy design, and isolation, so that the static electricity is easily charged and the noise could not be eliminated causing huge influences to the instrument, the environment, and the human body. Many countries have announced the standard for the electromagnetic compatibility and the device which does not conform to the standard is not allowed to be sold. Therefore, the skill for the electromagnetic compatibility and the shielding material becomes the key point of the design of the electronic product. Because of the superior electric conductivity and the dielectric feather, the conductive polymer is emphasized in the application of the electric shielding materials.

SUMMARY OF THE INVENTION

Therefore, the invention provides a method for producing a carbon nanotube compound, which has anti-electromagnetic-radiation effect, provided as a shielding material for electric product.

A scope of the invention is to provide a method for producing a carbon nanotube compound.

According to an embodiment of the invention, the method for producing the carbon nanotube compound includes the following steps. Firstly, an Aniline-trimer and a first DMAc (dimethyl acetamide) solution are mixed to form a first solution. And then, a Dianhydride and a second DMAc solution are mixed to form a second solution. And then, the second solution and the first solution are mixed to form a third solution. Afterwards, carboxyl-multiwall carbon nanotubes (c-MWNTs), a Diaminodiphenylether, and a third DMAc solution are mixed to form a fourth solution.

Furthermore, the fourth solution and the third solution are mixed to obtain a polyamic acid/CNT solution. Finally, a part of the polyamic acid/CNT solution is spread on a substrate and then the part of the polyamic acid/CNT solution spread on the substrate is processed by a thermal treatment to form the carbon nanotube compound on the substrate.

Another scope of the invention is to provide a carbon nanotube compound, and the carbon nanotube compound could be a polyamic acid/CNT compound.

According to another embodiment of the invention, the carbon nanotube compound includes a polyamic acid and a plurality of carboxyl-multiwall carbon nanotubes distributed in the polyamic acid uniformly.

Because carbon nanotubes have weak van der waals forces to easily gathering and there is no interactive force between carbon nanotubes and polymer materials, carbon nanotubes could not be distributed in polymer materials. Compared to the prior art, the advantage of the invention is to bring carbon nanotube a dissolving character for being distributed in the polymer uniformly through a surface functional group transformation to generate a carboxylic acid (—COOH) on the surface of the carbon nanotube.

The advantage and spirit of the invention may be understood by the following recitations together with the appended drawings.

BRIEF DESCRIPTION OF THE APPENDED DRAWINGS

DETAILED DESCRIPTION OF THE INVENTION

The invention is to provide a method for producing a carbon nanotube compound, and the carbon nanotube compound could be a polyamic acid/CNT compound, wherein the carbon nanotubes could be carboxylic-multiwall carbon nanotubes distributed in the polyamic acid uniformly. The embodiments of the invention are described as the following.

Figure 1:
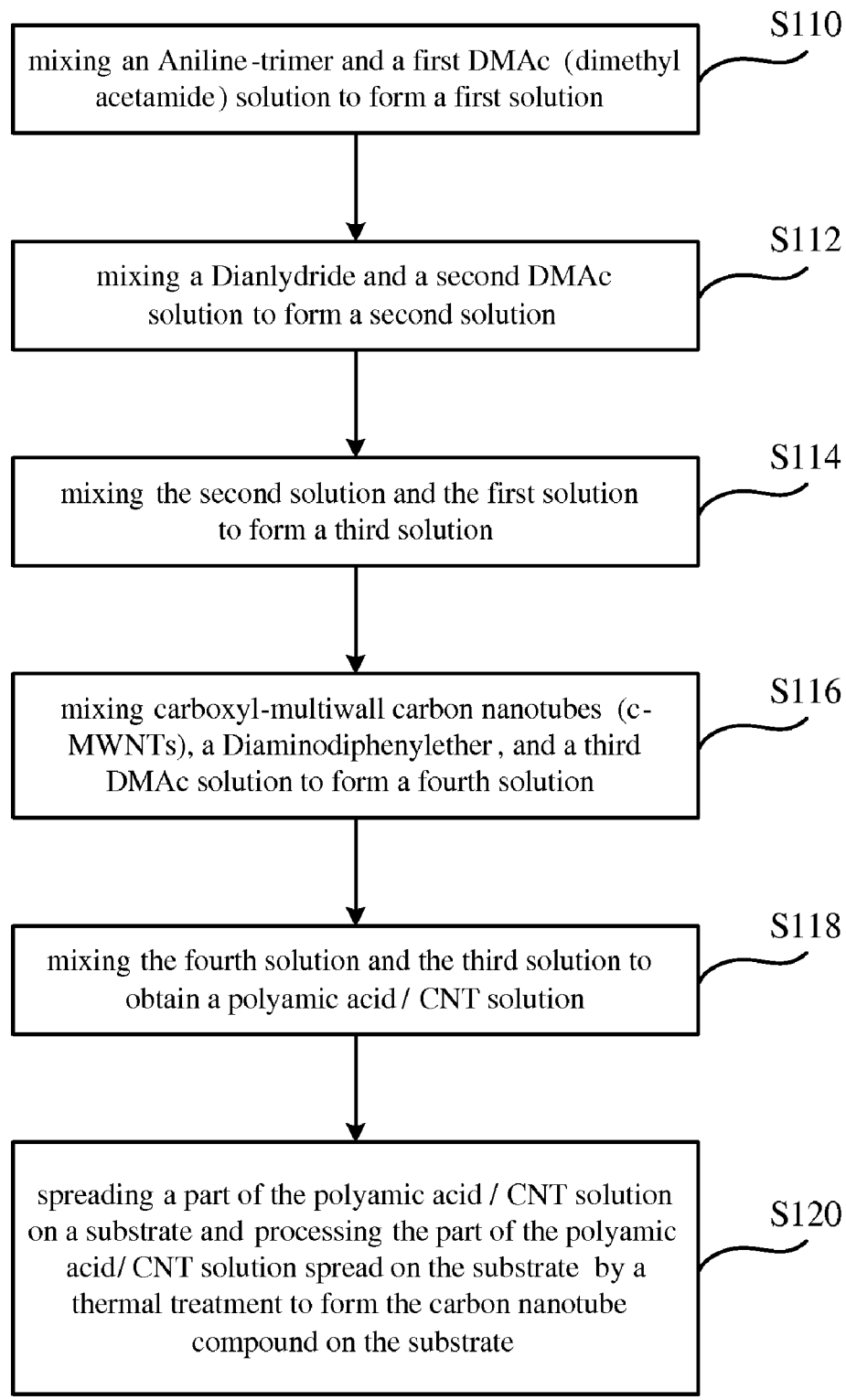
FIG. 1 is a flow chart illustrating the method for producing a carbon nanotube compound according to an embodiment of the invention.

Please refer to FIG. 1. FIG. 1 is a flow chart illustrating the method according to an embodiment of the invention.

As shown in FIG. 1, the method of the embodiment includes the following steps: firstly, in step S110 of the method, an Aniline-trimer and a first DMAc(dimethyl acetamide) solution are mixed to form a first solution. And then, in step S112 of the method, a Dianhydride and a second DMAc solution are mixed to form a second solution. And then, in step S114 of the method, the second solution and the first solution are mixed to form a third solution. Afterwards, in step S116 of the method, carboxyl-multiwall carbon nanotubes (c-MWNTs), a Diaminodiphenylether, and a third DMAc solution are mixed to form a fourth solution. In practice, the ratio of the components of the fourth solution could be adjusted according to conditions.

Furthermore, in step S118 of the method, the fourth solution and the third solution are mixed to obtain a polyamic acid/CNT solution. Finally, in step S120 of the method, a part of the polyamic acid/CNT solution is spread on a substrate and then the part of the polyamic acid/CNT solution spread on the substrate is processed by a thermal treatment to form the carbon nanotube compound on the substrate.

The conditions for executing the method of the invention will be described in the following. It should be noted that the process, the materials, the parameter, and the data are for explaining but not limiting the invention.

Firstly, 0.1363 g (0.47 mmole) Aniline-trimer is dissolved in 6 g DMAc(dimethyl acetamide) and the mixture is stirred at room temperature for 24 hours to form a first solution. Secondly, 0.5205 g (1 mmole) Dianhydride is dissolved in 1.5 g DMAc and the mixture is stirred at room temperature for 30 minutes to form a second solution. Thirdly, the second solution is mixed with the first solution and the mixture is stirred at room temperature for 24 hours to form a third solution. Fourthly, carboxyl-multiwall carbon nanotubes (c-MWNTs) and 0.2002 g (1 mmole) Diaminodiphenylether are dissolved in 2.5 g DMAc and the mixture is stirred at room temperature for 24 hours to form a fourth solution, wherein the carboxyl-multiwall carbon nanotubes occupy 0.5~3 weight percents of the fourth solution.

Furthermore, the fourth solution is mixed with the third solution, and the mixed solution is stirred at room temperature for 24 hours to obtain a polyamic acid/CNT solution. Finally, a suitable quantity of the polyamic acid/CNT solution is spread on a glass plate and the part of the polyamic acid/CNT solution spread on the glass plate is processed by a thermal treatment to form the carbon nanotube compound on the glass plate.

The temperature of the processes of the thermal treatment is increased from room temperature to 300° C. stage by stage, and then decreased from 300° C. to room temperature stage by stage. The details of the processes of the thermal treatment for forming the carbon nanotube compound are shown in Table. 1.

TABLE 1

| process | temperature | time |
|---|---|---|
| increasing | Room temp.~° C. | 30 min |
| increasing | 80° C.~150° C. | 6 hrs |
| increasing | 150° C.~200° C. | 6 hrs |
| increasing | 200° C.~250° C. | 2 hrs |
| increasing | 250° C.~300° C. | 3 hrs |
| holding | 300° C. | 3 hrs |
| decreasing | 300° C.~Room temp. | 8 hrs |

In this embodiment, the carbon nanotube compound is a polyamic acid/CNT compound, wherein the carbon nanotubes are carboxylic-multiwall carbon nanotubes and distributed in the polyamic acid. Besides, a molar ratio of the Aniline-trimer to the Dianhydride to the Diaminodiphenylether is about, but not limited to, 0.47:1:1. In practice, the c-MWNTs occupy about 0.5~3 weight percents of the fourth solution.

In practice, the c-MWNTs could be made by the following steps. Multiwall carbon nanotubes and a sulfuric acid/nitric acid mixed solution are mixed to perform a surface functional group transformation under ultrasonic vibration conditions to obtain the c-MWNTs, wherein a carboxylation is acting to generate carboxylic acids on the surfaces of the multiwall carbon nanotubes when the multiwall carbon nanotubes are mixed with the sulfuric acid/nitric acid. The ratio of the sulfuric acid to the nitric acid of the sulfuric acid/nitric acid mixed solution could be 3:1, the purity of the sulfuric acid could be 90%, and the purity of the nitric acid could be 70%. In practice, it should be noted that the ratio and the purity of the sulfuric acid to the nitric acid could be adjusted according to conditions.

The conditions for the method to produce Aniline-trimer will be described in the following. It should be noted that the process, the materials, the parameter, and the data are for explaining but not limiting the invention.

Firstly, multiwall carbon nanotubes are mixed with a sulfuric acid/nitric acid mixed solution to perform a surface functional group transformation at a temperature of 20±5° C. under ultrasonic vibration conditions for 23 hours, wherein the ratio of the sulfuric acid to the nitric acid of the sulfuric acid/nitric acid mixed solution is 3:1, the purity of the sulfuric acid is 90%, and the purity of the nitric acid is 70%. The product from the above processes is filtered in air pumping condition and then is washed by deionized water and methanol for four times. The filtered c-MWNTs are placed in air oven at a temperature of 60° C. for 24 hours to remove the unnecessary water to obtain the c-MWNT.

Figure 2:
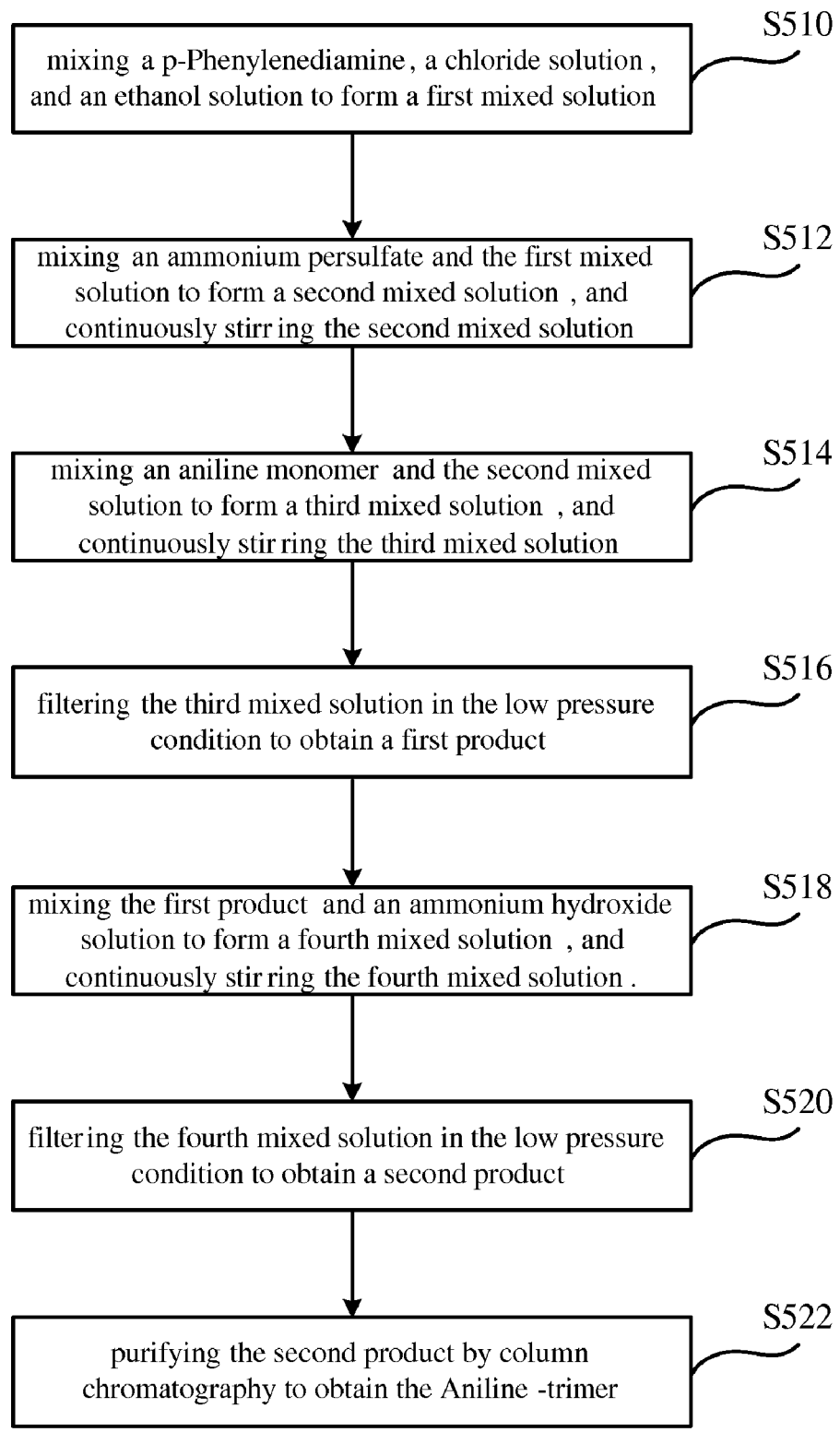
FIG. 2 is a flow chart illustrating the method for producing the Aniline-trimer in FIG. 1.

Please refer to FIG. 2. FIG. 2 is a flow chart illustrating the method for producing the Aniline-trimer in FIG. 1. Firstly, in step S510 of the method, a p-Phenylenediamine, a chloride solution, and an ethanol solution are mixed to form a first mixed solution. Secondly, in step S512 of the method, an ammonium persulfate and the first mixed solution are mixed to form a second mixed solution, and the second mixed solution is continuously stirred. Thirdly, in step S514 of the method, an aniline monomer is mixed with the second mixed solution to form a third mixed solution, and the third mixed solution is continuously stirred. Fourthly, in step S516 of the method, the third mixed solution is filtered in low pressure condition to obtain a first product. Fifthly, in step S518 of the method, the first product is mixed with an ammonium hydroxide solution to form a fourth mixed solution, and the fourth mixed solution is continuously stirred. Furthermore, in step S520 of the method, the fourth mixed solution is filtered in low pressure condition to obtain a second product. Finally, in step S522 of the method, the second product is purified by column chromatography to obtain the Aniline-trimer.

The conditions for the method to produce Aniline-trimer will be described in the following. It should be noted that the process, the materials, the parameter, and the data are for explaining but not limiting the invention.

Firstly, 0.86 g (8 mmol) p-Phenylenediamine, 100 ml chloride solution (1M), and 40 ml ethanol solution are mixed with each other, and the mixed solution reacts in an ice bath at −5° C. to form a first mixed solution. Secondly, 1.8 g (8 mmol) ammonium persulfate is mixed with the first mixed solution to form a second mixed solution, and the second mixed solution is continuously stirred. After 5 minutes, when the product becomes brown, 1.5 ml (16 mmol) aniline monomer is mixed with the second mixed solution above-mentioned to form a third mixed solution, and the third mixed solution is continuously stirred. After several minutes, when the product becomes blue, the third mixed solution is stirred for 30 minutes.

Afterwards, the product in the filtered in the air pumping condition and then by 30 ml hydrogen chloride (1M) and 80 ml distilled water solution to obtain a first product. The first product is mixed with 40 ml ammonium hydroxide (1M) to form a fourth mixed solution, and the fourth mixed solution is stirred for 1~2 hours at room temperature. Furthermore, the fourth mixed solution is filtered in air pumping condition and then the product is washed by the distilled water until that the pH value of the product is close to 7 to obtain a second product, wherein the second product is blue-russet. Finally, the second product is purified by column chromatography to obtain the Aniline-trimer.

Because carbon nanotubes have weak van der waals forces to easily gathering and there no interactive force between carbon nanotubes and polymer materials, carbon nanotubes could not be distributed in polymer materials uniformly. Compared to the prior art, the advantage of the invention is to bring carbon nanotube a dissolving character for being distributed in polymer uniformly through a surface functional group transformation to generate a carboxylic acid (—COOH) on the surface of the carbon nanotube.

With the example and explanations above, the features and spirits of the invention will be hopefully well described. Those skilled in the art will readily observe that numerous modifications and alterations of the invention may be made while retaining the teaching of the invention. Accordingly, the above disclosure should be construed as limited only by the metes and bounds of the appended claims.

What is claimed is:

1. A method for producing a carbon nanotube (CNT) compound, comprising the following steps:

mixing an Aniline-trimer and a first DMAc(dimethyl acetamide) solution to form a first solution;

mixing a Dianhydride and a second DMAc solution to form a second solution;

mixing the second solution and the first solution to form a third solution;

mixing carboxyl-multiwall carbon nanotubes (c-MWNTs), a Diaminodiphenylether, and a third DMAc solution to form a fourth solution;

mixing the fourth solution and the third solution to obtain a polyamic acid/CNT solution; and spreading a part of the polyamic acid/CNT solution on a substrate and processing the part of the polyamic acid/CNT solution spread on the substrate by a thermal treatment to form the carbon nanotube compound on the substrate.

2. The method of claim 1, wherein a molar ratio of the Aniline-trimer to the Dianhydride to the Diaminodiphenylether is about 0.47:1:1.

3. The method of claim 1, wherein the c-MWNTs substantially occupy 0.5-3 weight percents of the fourth solution.

4. The method of claim 1, wherein a temperature of the thermal treatment is increased from room temperature to about 300° C. stage by stage.

5. The method of claim 1, further comprising the following step:

mixing a multiwall carbon nanotube and a sulfuric acid/nitric acid mixed solution to perform a surface functional group transformation to generate a carboxylic acid on the surface of the multiwall carbon nanotube to obtain the carboxyl-multiwall carbon nanotube.

6. The method of claim 5, wherein a volumetric ratio of the sulfuric acid to the nitric acid of the sulfuric acid/nitric acid mixed solution is 3:1; the purity of the sulfuric acid is 90%, and the purity of the nitric acid is 70%.

7. The method of claim 5, wherein the surface functional group transformation is performed under ultrasonic vibration conditions.

8. The method of claim 1, further comprising the following steps:

mixing p-Phenylenediamine, chloride solution, and ethanol solution to form first mixed solution;

mixing ammonium persulfate and the first mixed solution to form second mixed solution, and stirring the second mixed solution;

mixing an aniline monomer and the second mixed solution to form a third mixed solution and stirring the third mixed solution;

filtering the third mixed solution under low pressure condition to obtain a first product;

mixing the first product and an ammonium hydroxide solution to form a fourth mixed solution and stirring the fourth mixed solution;

filtering the fourth mixed solution under low pressure condition to obtain a second product; and purifying the second product by column chromatography to obtain the Aniline-trimer.

9. The method of claim 8, wherein a molar ratio of the p-Phenylenediamine to the ammonium persulfate to the aniline monomer is about 1:1:2.

* * * * *